United States Patent
Burke

(10) Patent No.: US 10,320,015 B1
(45) Date of Patent: Jun. 11, 2019

(54) FUEL CELL POWER MANAGEMENT

(71) Applicant: The United States of America, as represented by the Administrator of the National Aeronautics and Space Administration, Washington, DC (US)

(72) Inventor: Kenneth A. Burke, Chardon, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 504 days.

(21) Appl. No.: 14/640,866

(22) Filed: Mar. 6, 2015

Related U.S. Application Data

(60) Provisional application No. 61/949,349, filed on Mar. 7, 2014.

(51) Int. Cl.
*H01M 8/249* (2016.01)
*H01M 8/2465* (2016.01)
*H01M 8/2404* (2016.01)
*H01M 8/24* (2016.01)
*H01M 8/04537* (2016.01)

(52) U.S. Cl.
CPC .............................. *H01M 8/04559* (2013.01)

(58) Field of Classification Search
None
See application file for complete search history.

(56) References Cited

U.S. PATENT DOCUMENTS

| | | | |
|---|---|---|---|
| 6,383,673 B1 | 5/2002 | Faris et al. | |
| 6,497,974 B2 | 12/2002 | Fuglevand | |
| 6,541,941 B2 | 4/2003 | Adams et al. | |
| 2004/0009380 A1* | 1/2004 | Pearson | H01M 8/04089 429/431 |
| 2005/0287411 A1* | 12/2005 | Dewey | B60L 11/1883 429/428 |
| 2006/0051645 A1 | 3/2006 | Hu et al. | |
| 2006/0088754 A1 | 4/2006 | Hu et al. | |
| 2010/0081018 A1 | 4/2010 | Sridhar et al. | |
| 2010/0136449 A1 | 6/2010 | Yanase et al. | |
| 2011/0062795 A1 | 3/2011 | Srinivasan et al. | |
| 2011/0256463 A1 | 10/2011 | Michalske et al. | |
| 2013/0071698 A1 | 3/2013 | Yemul et al. | |

* cited by examiner

*Primary Examiner* — Yoshitoshi Takeuchi
(74) *Attorney, Agent, or Firm* — Robert H. Earp, III; William M. Johnson

(57) ABSTRACT

Systems, methods, and other embodiments associated with fuel cell power management. According to one embodiment, a fuel cell stack includes a plurality of fuel cells producing electric potentials. An electric potential of a fuel cell is measured as a fuel cell voltage. The fuel cell stack further includes a plurality of connection points including a ground, a first connection point, and a second connection point. The first connection point draws a first voltage based on combined fuel cell voltages of a first set of fuel cells of the plurality of fuel cells. The second connection point draws a second voltage based on the combined fuel cell voltages of a second set of fuel cells of the plurality of fuel cells.

6 Claims, 4 Drawing Sheets

FUEL CELL POWER MANAGEMENT

CROSS REFERENCE TO RELATED APPLICATIONS

This application claims the benefit of U.S. Provisional Patent application, Ser. No. 61/949,349, entitled Fuel Cell Power Management, filed on Mar. 7, 2014, which is hereby incorporated by reference herein.

ORIGIN OF THE INVENTION

The invention described herein was made by employees of the United States Government and may be manufactured and used by or for the Government for Government purposes without the payment of any royalties thereon or therefore.

BACKGROUND

In general, a fuel cell includes an anode and a cathode separated by an electrolyte. Charges move between the anode and the cathode producing direct current (DC) electricity. Specifically, a chemical reaction strips hydrogen atoms of their electrons, resulting in the hydrogen atoms being "ionized." The ionized hydrogen atoms carry a positive electrical charge. The negatively charged electrons provide the current. Individual fuel cells produce relatively small electrical potentials. Because the electrical potentials are small, fuel cells are "stacked" or placed in series, to increase the combined voltage such that the voltage meets an application's requirements. To utilize the electric current, connection points are used to draw off the current.

Typically, the connection points are at the extreme ends of the fuel cell stack. Direct current (DC) power converters are used to convert the voltage produced at the ends of the stack into voltages that can be used by attached devices. These DC converters add expense and inefficiency to the fuel cell system. In addition the DC converters are undesireable additional mass, volume and points of failure.

SUMMARY

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

Systems, methods, and other embodiments associated with fuel cell power management are described herein. According to one embodiment, a fuel cell stack includes a plurality of fuel cells producing electric potentials. An electric potential of a fuel cell is measured as a fuel cell voltage. The fuel cell stack further includes a plurality of connection points including a ground, a first connection point, and a second connection point. The first connection point draws a first voltage based on combined fuel cell voltages of fuel cells located between the ground and the first connection point. The second connection point draws a second voltage based on the combined fuel cell voltages of fuel cells located between the ground and the second connection point.

The following description and drawings set forth certain illustrative aspects and implementations. These are indicative of but a few of the various ways in which one or more aspects may be employed. Other aspects, advantages, or novel features of the disclosure will become apparent from the following detailed description.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
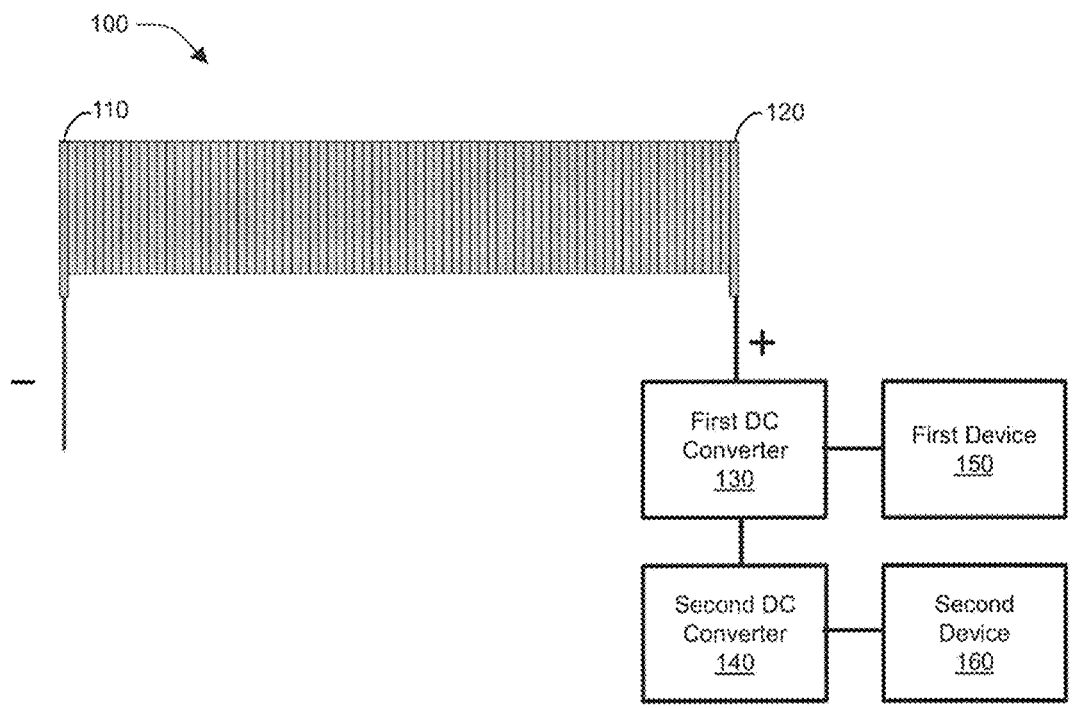
FIG. 1 illustrates one embodiment of a prior art system associated with fuel cell power management.

Embodiments or examples illustrated in the drawings are disclosed below using specific language. It will nevertheless be understood that the embodiments or examples are not intended to be limiting. Any alterations and modifications in the disclosed embodiments and any further applications of the principles disclosed are contemplated as would normally occur to one of ordinary skill in the art. Described herein are examples of systems, methods, and other embodiments associated with fuel cell power management.

FIG. 1 illustrates one embodiment of a prior art system associated with a fuel cell stack 100. The fuel cell stack 100 provides power for different applications. As discussed above, a fuel cell stack 100 includes a number of fuel cells. The fuel cell stack 100 further includes a first connection point 110 and a second connection point 120. As shown, the first connection point 110 and the second connection point 120 are located at the extreme ends of the fuel cell stack 100 separated by the fuel cells.

The first connection point 110 serves as a ground to ground the fuel cell stack 100. The second connection point 120 draws off generated current from the fuel cell stack 100. The generated current is a direct current (DC). However, applications may not be able to utilize the full amount of DC from the fuel cell stack 100. In fact, receiving the full amount of DC from the fuel cell stack 100 may cause damage to devices associated with the applications. Accordingly, at least one DC converter, converts the received voltage to a desired voltage. For example, a DC converter 130 and a second DC converter 140 convert the voltage produced at the second connection point 120 into the desired voltage for the application. Suppose that the connection point 120 is connected to the first DC converter 130. The first DC converter 130 converts the voltage to voltage appropriate to the first device 150. Likewise, the second DC converter 140 converts the voltage to a voltage appropriate to a second device 160.

The first DC converter 130 and second DC converter 140 are added because operation of a fuel cell system requires DC electrical power at a different voltage than is produced at the ends of the fuel cell stack 100. The DC converters reduce the voltage produced at the ends of the fuel cell stack 100 to some smaller voltage which is then used to operate devices connected to the fuel cell stack 100. Depending on the specifics of this power conversion, the conversion efficiency can vary. The first DC converter 130 and second DC converter 140 increase cost, reduce the overall system efficiency, increase the system part count which reduces reliability, and increase both the mass and volume of the fuel cell system.

Figure 2:
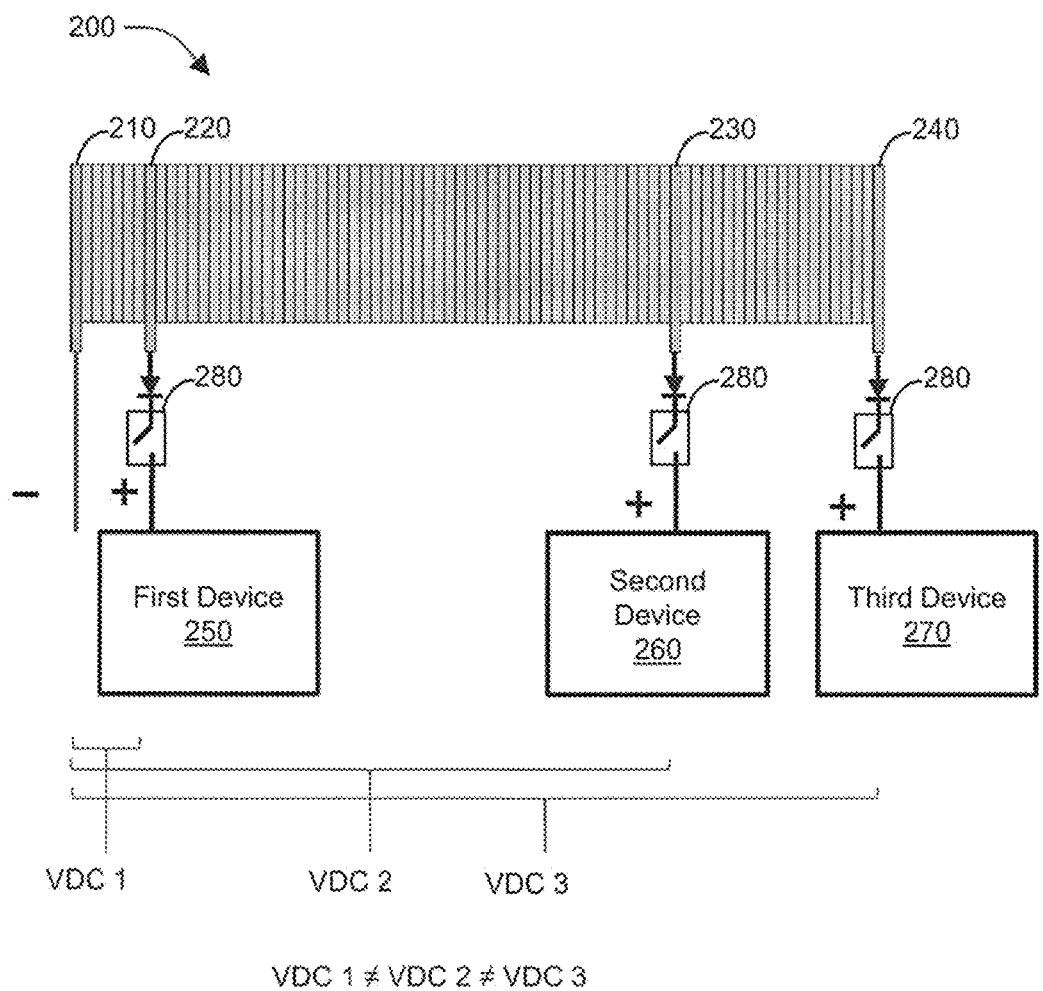
FIG. 2 illustrates one embodiment of a system associated with fuel cell power management.

FIG. 2 illustrates one embodiment of a system associated with fuel cell power management. Fuel cell stacks are used in a diverse number of applications. Specifically, the fuel cell stack 200 powers devices such as fuel cell systems valves, pumps, heaters, electronics that comprise the balance of the fuel cell system. The fuel cell stack may also power external devices.

The system includes a fuel cell stack 200 that has a plurality of fuel cells producing electric potentials. The electric potentials of the fuel cells are measured as fuel cell voltages. The fuel cell voltages of each of the fuel cells may be equivalent or the fuel cells may have different fuel cell voltages. The fuel cells are stacked (i.e., placed in series) to increase the ultimate voltage to meet the requirements of any application. As discussed above, each fuel cell has an anode and a cathode. The fuel cells are stacked such that the anode of one fuel cell is adjacent to the cathode of the next. Accordingly, one end of the fuel cell stack 200 is an anode and the other end of the fuel cell stack 200 is a cathode.

The fuel cell stack 200 further includes a plurality of connection points including a ground 210, a first connection point 220, a second communication 230, and a third connection point 240. The ground 210 is a reference point from which the fuel cell voltages can be measured. The remaining connection points: the first connection point 220, the second connection point 230, and the fourth connection point 240 draw the power from the fuel cell stack 200. For example, suppose that an extreme anode may be adjacent to the ground 210 and the extreme cathode may be adjacent to the connection point 240. The connection points 220, 230, and 240 create multiple pathways to the extreme anode of the fuel cell stack.

The connection points provide power to a plurality of devices. For example, the first connection point 220 provides power to the first device 250. The second connection point 230 provides power to the second device 260. The third connection point 240 provides power to the third device 270. The placement of the connection points 220, 230, and 240 may be dependent on the amount of power required by the corresponding devices 250, 260, and 270. Specifically, the first connection point 220 draws a first voltage based on combined fuel cell voltages of fuel cells located between the ground 210 and the first connection point 220. Likewise, the second connection point 230 draws a second voltage based on the combined fuel cell voltages of fuel cells located between the ground 210 and the second connection point 230. Likewise, the third connection point 240 draws a third voltage based on the combined fuel cell voltages of fuel cells located between the ground 210 and the third connection point 240.

The individual fuel cells of the fuel cell stack 200 produce current electrochemically. The current produced by each cell within the fuel cell stack 200 is determined by the current withdrawn from the fuel cell stack at each of the connection points 220, 230, and 240. Consider that each fuel cell produces a single volt and that the first device 250 is equipment ancillary to the fuel cell stack that requires 6V to be powered. Then the ground 210 and the first connection are separated by 6 fuel cells. However, if a particular cell within the fuel cell stack 200 is the source of current for multiple power connections then the current produced by that fuel cell is the sum total of the current withdrawn by those multiple power connection points.

Accordingly, the fuel cell stack 200 has multiple power connection points 220, 230, and 240 that connect a different number of fuel cells in electrical series. The connection points 220, 230, and 240 are able to simultaneously able to deliver different multiple DC voltages to the devices 250, 260, and 270 without requiring the addition of DC converters thereby simplifying the system.

Additional electronic functionality can be used in conjunction with the connection points 220, 230, and 240 and paths therefrom. For example, switches 280 can be put into each of the paths of the connection points 220, 230, and 240. The switches 280 allow the power delivered to the devices 250, 260, and 270 from the corresponding connection point to be turned on and off.

Figure 3:
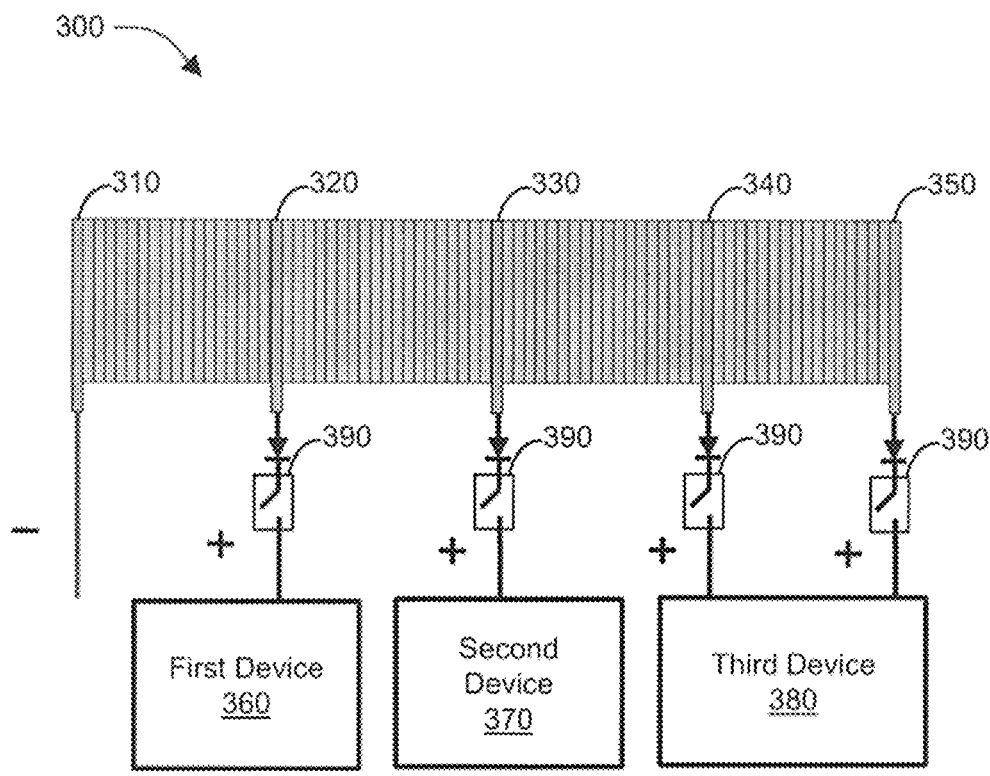
FIG. 3 illustrates another embodiment of a system associated with fuel cell power management.

FIG. 3 illustrates another embodiment of a system associated with fuel cell power management. The fuel cell stack 300 operated in a similar manner as the fuel cell stack 200 of FIG. 2. Specifically, the 310 is a ground that operates in a similar manner as the ground 210 of FIG. 2. Likewise, the connection points 320, 330, 340, and 350 operate in a similar manner as the connection points 220, 230, and 240 of FIG. 2. In addition, the first device 360, the second device 370, and the third device 380 operate in a similar manner as the first device 250, the second device 260, and the third device 270 of FIG. 2.

However, here, the connection points 340 and 350 both form pathways to the third device 380. Accordingly, if the third device 380 requires more power than a single connection point can offer from the fuel cell stack 300, both connection points 340 and 350 are connected to the third device. Accordingly, two or more connection points can be configured to be connected to a device.

The switches 390 operate in a similar manner as the switches of 280 of FIG. 2. Specifically, the switches 390 all the power from the fuel cell stack 300 to be turned on and off before reaching the first device 360, the second device 370, or the third device 380.

Figure 4:
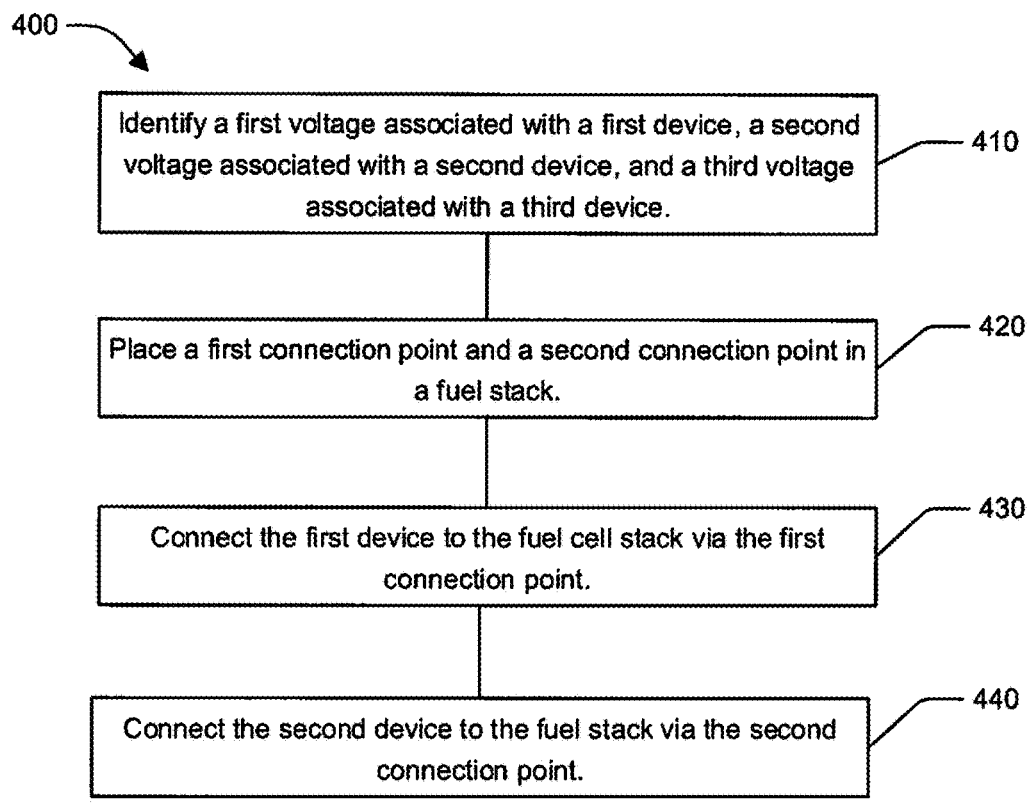
FIG. 4 illustrates one embodiment of a method associated with fuel cell power management.

FIG. 4 illustrates one embodiment of a method 400 associated with fuel cell power management. The method 400 includes, at 410, identifying a first voltage associated with a first device, a second voltage associated with a second device, and a third voltage associated with a third device. The voltages may be identified based on the voltage requirements of the devices. For example, the devices may require different power levels to operate properly. In another embodiment, the voltages may be predetermined.

At 420, a first connection point and a second connection point are placed in a fuel cell stack. The fuel cell stack includes a ground and a plurality of fuel cells. The first connection point is configured to draw the first voltage from the fuel cell stack based on combined fuel cell voltages of a first set of the fuel cells. The first set of fuel cells is placed between the ground and the first connection point. The second connection point is configured to draw the second voltage based on combined fuel cell voltages of a second set fuel cells. The second set of fuel cell is placed between the ground and the second connection point. In one embodiment, the first voltage and the second voltage are different.

At 430, the first device is connected to the fuel cell stack via the first connection point. At 440, the second device is connected to the fuel cell stack via the second connection point. In one embodiment, the first connection is configured to provide the first voltage to the first device and the second connection is configured to provide the second voltage to the second device simultaneously. While the example show two and three connection points, more or fewer connection points may be used. For example, the number of connection points may based on the number of devices to be connected to the fuel cell stack.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A fuel cell power management system, comprising:
    a plurality of fuel cells stacked in series and having a first extreme end at one end of the stack and a second extreme end at the opposite end of the stack, the plurality of fuel cells configured to produce electric potentials, wherein an electric potential of a fuel cell is measured as a fuel cell voltage; and
    a ground connection point located at the first extreme end of the stack;
    an extreme connection point located at the second extreme end of the stack and configured to draw a total voltage based on the combined fuel cell voltages between the ground connection point and the extreme connection point;
    a first connection point located along the stack between the ground connection point and the extreme connection point and configured to draw a first voltage based on the combined fuel cell voltages between the ground connection point and the first connection point;
    a second connection point located along the stack between the first connection point and the extreme connection point and configured to draw a second voltage based on the combined fuel cell voltages between the ground connection point and the second connection point;
    wherein the second connection point and the extreme connection point are both connected to a shared device to selectively provide a second voltage or a total voltage to the shared device; and
    wherein the current produced by each cell within the stack is determined by the current withdrawn from the stack at each of the connection points.

2. The fuel cell power management system of claim 1, wherein the first connection point is configured to be connected to a first device, wherein the first device is configured to require the first voltage.

3. The fuel cell power management system of claim 1, wherein the first voltage is different from the total voltage.

4. The fuel cell power management system of claim 1, wherein the fuel cell stack is a part of a fuel cell system, and wherein the first device is internal to the fuel cell system.

5. The fuel cell power management system of claim 4, wherein the first device is a pump of the fuel cell system, a heater of the fuel cell system, or electronics of the fuel cell system.

6. The fuel cell power management system of claim 1 further comprising one or more than one additional connection points located along the stack between the ground connection point and the extreme connection point and configured to draw a voltage based on the combined fuel cell voltages between the ground connection point and each one or more than one additional connection points.

* * * * *